Oct. 25, 1932.  R. A. HEISING  1,884,675
ELECTRIC WAVE TRANSMISSION SYSTEM
Filed Oct. 24, 1928   6 Sheets-Sheet 1

INVENTOR
R. A. HEISING
BY
ATTORNEY

Oct. 25, 1932.  R. A. HEISING  1,884,675
ELECTRIC WAVE TRANSMISSION SYSTEM
Filed Oct. 24, 1928  6 Sheets-Sheet 2

INVENTOR
R. A. HEISING
BY
H. A. Burgess
ATTORNEY

INVENTOR
R. A. HEISING
BY
ATTORNEY

Oct. 25, 1932.   R. A. HEISING   1,884,675
ELECTRIC WAVE TRANSMISSION SYSTEM
Filed Oct. 24, 1928   6 Sheets-Sheet 4

INVENTOR
*R. A. HEISING*
BY
*H. A. Burgess*
ATTORNEY

Oct. 25, 1932.     R. A. HEISING     1,884,675
ELECTRIC WAVE TRANSMISSION SYSTEM
Filed Oct. 24, 1928     6 Sheets-Sheet 5

INVENTOR
R. A. HEISING
BY
*K. A. Burgess*
ATTORNEY

Patented Oct. 25, 1932

1,884,675

UNITED STATES PATENT OFFICE

RAYMOND A. HEISING, OF MILLBURN, NEW JERSEY, ASSIGNOR TO BELL TELEPHONE LABORATORIES, INCORPORATED, OF NEW YORK, N. Y., A CORPORATION OF NEW YORK

ELECTRIC WAVE TRANSMISSION SYSTEM

Application filed October 24, 1928. Serial No. 314,610.

This invention relates to wave transmission, as for example, in vacuum tube circuits for amplification of electric waves, production of sustained electrical oscillations, or other functions.

An object of the invention is to facilitate transmission of waves of certain frequencies, to the exclusion of other waves, with uniformly high transmission efficiency.

It is also an object of the invention to facilitate variation of the adjustment of the frequency selectivity of an amplifier without undue variation of the width of the frequency band transmitted by the amplifier or the gain of the amplifier, and without undue sacrifice of the gain of the amplifier.

Specific objects are to facilitate obtaining approximately constant band width over the range of frequency adjustment, to facilitate obtaining approximately constant gain over the range of frequency adjustment, to facilitate obtaining maximum gain over the range of frequency adjustment, and to facilitate obtaining any desired combination of these characteristics.

In one specific aspect, the invention is a radio receiver of the radio frequency amplifier type in which maximum gain per stage and constant width of transmitted frequency band are obtained throughout the range of tuning of the receiver, with only one adjustment in each interstage coupling circuit. The adjustment consists in variations in an inductance device in the coupling circuit. With a view to obtaining high gain the impedance across the output side of the coupling circuit is made high. The effective input capacity or impedance of the vacuum tube or vacuum tube stage that is fed by the coupling circuit may constitute the impedance coupling the interstage circuit to the tube or stage that it feeds, where maximum gain is desired, i. e., the highest gain consistent with the given input admittance of the vacuum tube or vacuum tube stage that is fed by the coupling circuit.

With a view to obtaining constant gain, maximum gain and constant band width, the coupling circuit may be so constructed that the ratio of its resistance to its inductance is constant over the range of frequency adjustment.

In case the ratio is allowed to vary, a feed back circuit may be provided for causing regeneration in the amplifier, variable in degree automatically with the frequency transmitted, to compensate for effects of variation of the ratio upon the gain and width of the transmitted frequency band. To assist in maintaining constant gain over the range of frequency adjustment, each of the impedances by which the coupling circuit is coupled to two vacuum tube stages, respectively, may be capacitive and of fixed value. The characteristics of constant gain, maximum gain and constant band width can also be obtained with a mutual inductance coupling to the first of the two tubes, instead of capacitive coupling, the mutual inductance being constructed to vary substantially inversely with the square of the frequency.

The supply circuit that feeds a regenerative vacuum tube stage can be connected to such a point on the feed back circuit of the stage that regenerated waves are balanced out or neutralized with respect to the supply circuit and the regeneration is thus prevented from reacting upon the supply circuit.

Types of connections for accomplishing this purpose are useful also in the case of a vacuum tube device employed as an oscillator, for example to prevent the oscillator from reacting on a control circuit therefor.

Further objects of the invention are to prevent reaction of amplifiers and oscillators upon supply or control circuits therefor.

Other objects and features of the invention will be apparent from the following description and claims.

Figure 1:
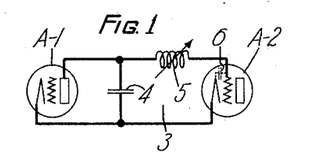
Figs. 1 to 4 are diagrams for facilitating explanation of the operation of circuits embodying forms of the invention as, for example, the radio receivers of Figs. 9, 10, 18 and 27.

In a radio frequency amplifier circuit there are two conditions required in the circuit proportionment to give maximum gain per stage at all tuning adjustments. First, the impedance attached to the output side of a tube delivering power should be equal to the output impedance (space path impedance) of the tube at all tuning adjustments; and second, the input impedance of the tube into which the circuit works (the tube to which power is delivered) should be as high as possible—in a tuned radio receiver it should be the grid capacity of the tube. Fig. 1 shows electric space discharge tubes A—1 and A—2 which may be successive stages of a radio frequency amplifier, the tube A—1 delivering power and the tube A—2 receiving it. The tubes are directly coupled by a tuned circuit 3 comprising a coupling capacity 4, an adjustable tuning inductance 5 and a load capacity 6 into which the power is delivered and which is represented as merely the grid capacity (effective input capacity) of the second tube A—2. Fixed capacity coupling connects the tuned circuit 3 with the first tube A—1. All the tuning is accomplished by varying the inductance 5. The proper attached impedance for the first tube (for the various adjustments of inductance 5) will occur with the fixed capacity coupling only if the resistance varies inversely with the square of the (tuning) frequency. Moreover, the capacities being fixed, the inductance must vary inversely as the square of the frequency. If the ratio of resistance to inductance is constant the proper circuit resistance will occur for proper attached impedance at all tuning adjustments.

The requirement of constant band width in a tuned circuit with variation in tuning of one element is that the ratio of resistance to inductance be constant for all frequencies. The condition mentioned in the preceding paragraph, to give proper attached impedance, therefore automatically gives constant band width.

Constant gain over the entire frequency range of tuning adjustments requires as one condition that similar impedances be used as the coupling impedances to the tubes generating power and receiving power unless there are other variables with frequency which compensate for differences produced by different reactances. A circuit such as Fig. 1, having capacity coupling to the plate or output side of the first tube and a second fixed capacity coupling to the grid or input side of the second tube will have constant gain over the range of frequency adjustments provided constant impedance is attached to the first tube at the same time.

Thus, the circuit shown in Fig. 1 with constant ratio of resistance to inductance will have all of the three desirable characteristics mentioned above.

Figure 2:
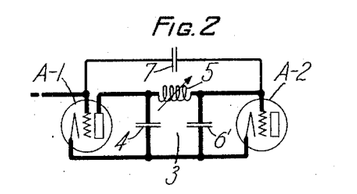
Figure 3:
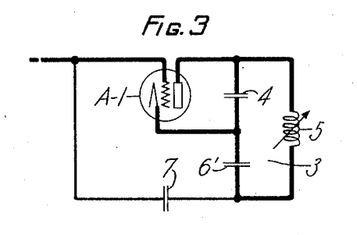
Figure 4:
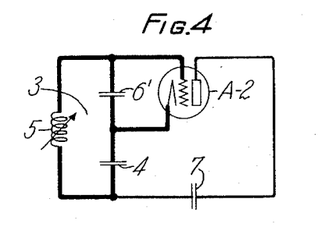

This type of circuit can be balanced to prevent singing, as shown in Figs. 2, 3 and 4. In each of these figures a balancing capacity 7 is employed for balancing out or neutralizing coupling effects between the input and output circuits of a tube that are caused by the grid-plate capacity in the tube. In Figs. 2 and 3 the tube A—1, and in Fig. 4 the tube A—2, has its grid-plate capacity balanced by condenser 7. Fig. 2 shows a capacity 6' which may represent either the grid capacity 6 or a condenser in addition to that capacity. Fig. 3 shows the same circuit as Fig. 2, except that tube A—2 is omitted and the circuit is rearranged with a view to indicating as clearly as possible the fact that the potential applied to the grid through the neutralizing or balancing condenser 7 is a potential opposite in sign to that of the plate. Fig. 4 indicates clearly that the neutralizing potential obtained from the plate is applied through condenser 7 to a point in tuned circuit 3 at a potential opposite in sign to that of the grid. In each of the Figs. 2, 3 and 4, the capacity 6' may, if desired, be small in comparison to the capacity 4. In fact, in Fig. 4 the capacity 6' may be merely the grid capacity of the tube A—2, the capacity 4 being the coupling capacity to the preceding tube; and in Figs. 2 and 3 the capacity 6' may be merely the grid capacity of the tube, such as A—2 of Figs. 1 and 2, into which the tuned circuit 3 works.

Figure 5:
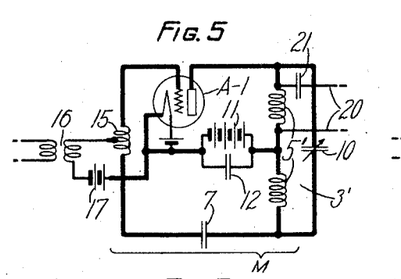
Fig. 5 shows a variably regenerative amplifier circuit embodying principles of the invention that are utilized also in the circuits of Figs. 9, 10 and 18.
Figure 6:
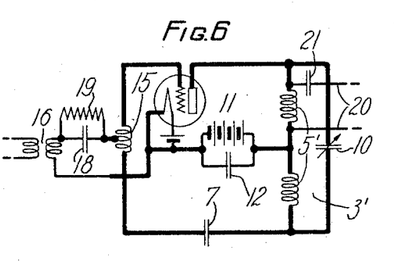
Fig. 6 shows an oscillator circuit utilizing like principles.

The characteristic of constant ratio of resistance to inductance over the entire frequency range does not obtain at high frequencies or those of the broadcast range, without special provision. However, a characteristic that has an equivalent effect as regards gain and width of frequency band transmitted can be obtained by causing regeneration with increased frequency so that increased resistance with increased frequency will be neutralized by increasing regeneration. Such variable regeneration can be obtained as indicated in Fig. 5. This circuit is an amplifier circuit comprising the tube A—1. The output circuit for the tube is balanced, the filament being connected through a plate battery 11 and by-pass condenser 12 to a point dividing an inductance 5′ which forms with a variable capacity 10 a circuit that can be tuned by adjusting the capacity. One end of inductance 5′ is connected to the plate. The other end, which has a potential of sign opposite to that of the plate, is connected through the balancing capacity 7 and an inductance 15 to the grid. The capacity 7 is used to neutralize the coupling effect between the input and output circuits of the tube caused by the grid-plate capacity. The inductance 15 is inserted in series with this balancing capacity so that at higher and higher frequencies the effective capacity in the balancing circuit gets larger and larger so that regeneration becomes greater and greater. To prevent this regeneration or variable regeneration from reacting on previous circuits the input transformer 16 or other input circuit for this amplifier circuit or stage is not connected directly across the grid-filament terminals of the tube but is connected between the filament and a point on inductance 15 other than either end. This point on the inductance is determined by the ratio of the balancing capacity to the grid-plate capacity. As indicated by the application of the symbol M in this figure, mutual inductance may be used between the output circuit inductance 5′ and the neutralizing circuit inductance 15, if the mutual inductance is also properly proportioned between the parts of both—that is, if the ratio of the mutual inductance between the two upper portions of the divided inductances to the mutual inductance between the two lower portions of the divided inductances is equal to the ratio of the self inductance of the upper portion to the self inductance of the lower portion of each coil. This circuit of Fig. 5 provides for regeneration and neutralization of the grid-plate capacity coupling effect simultaneously. The amount of regeneration in the circuit can also be so adjusted as to provide for generation of sustained oscillations, while still obtaining the neutralization of reaction upon the stage ahead, or input circuit. Preferably though not necessarily, when the circuit is to operate as an amplifier without oscillation, negative potential bias for the grid is obtained by a battery 17, and when the circuit is to generate sustained oscillations grid bias is obtained by a condenser and grid leak resistance. The latter form of circuit is shown in Fig. 6, which is the same as Fig. 5 except for the use of a condenser 18 and grid leak resistance 19, instead of the battery 17 of Fig. 5, to obtain the grid biasing potential. However, each of these circuits can have the amount of regeneration that is produced adjusted to any desired value, so that the circuit will function as an amplifier or as an oscillator at will with the reaction on the circuit ahead neutralized. In Figs. 5 and 6 a work circuit can be connected across any portion of coil 5′. For example, a work circuit 20 with a blocking condenser 21 therein is shown connected across the upper part of the coil.

These circuits of Figs. 5 and 6 will also function as described above if there is no mutual induction between the regeneration coil 15 and the coil 5′. If the two parts of the divided regeneration coil 15 do not have substantially perfect coupling between them, a perfect neutralization of reaction on the stage ahead will not occur unless another capacity is added (in the manner indicated in Figs. 8 and 9 described hereinafter) to balance the grid-filament capacity.

Figure 7:
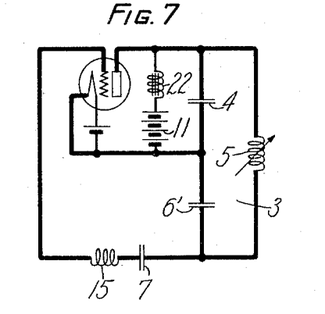
Fig. 7 shows an elementary form of circuit having features of the invention that are embodied in Figs. 5 and 6 for producing variable regeneration.

Fig. 7 shows a variable regeneration circuit of the general type of that in Fig. 6, in more elementary form and with the tuned circuit of the balanced output circuit constituted by two condensers 4 and 6′ and adjustable tuning inductance 5, the filament being connected to the junction of the two condensers. Battery 11 supplies plate current through a choke coil 22. The input controlling circuit is not shown but would be like elements 16 and 17 of Fig. 5. Coil 15 is such that it tunes with the balancing capacity 7 at a frequency higher than the highest frequency for which the circuit is designed. Regeneration increases with frequency.

Figure 8:
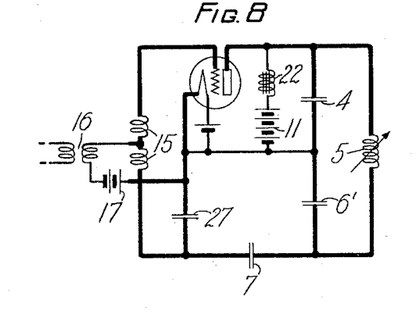
Fig. 8 shows a modification of the type of circuit shown in Fig. 7.

Fig. 8 shows a circuit such as that of Fig. 7, except that the coil 15 has been divided into two separate parts, and input transformer 16 and grid biasing battery 17 have been added in the manner indicated in Fig. 5, and there has also been added for balancing the grid-filament capacity of the tube, an extra balancing capacity 27 which is necessary for the most precise balance in this type of circuit. The need for this capacity becomes greater as the coupling between the two parts of the regeneration coil 15 departs from unity. The inductance ratio of the upper and lower parts of the regeneration coil 15 should be inversely as the ratio of the grid-plate capacity and the balancing capacity 7. Regeneration increases as the frequency is increased, so that with this type of circuit compensation can be obtained for the increase of the ratio of the resistance of the impedance facing the space path of the tube to the inductance of that impedance. The rate of variation of the regeneration with change of frequency is determined by the size of inductance 15 in relation to the balancing capacity 7. For all operating frequencies, regeneration in the circuit of Fig. 8 is prevented from reacting on any input circuit connected between the filament and the junction of the two parts of inductance 15, as the input transformer 16 for example. The circuit of Fig. 8 can be adjusted to give any desired degree of regeneration, so that it will operate to amplify without oscillation or so that it will generate sustained oscillations, as desired.

Figure 9:
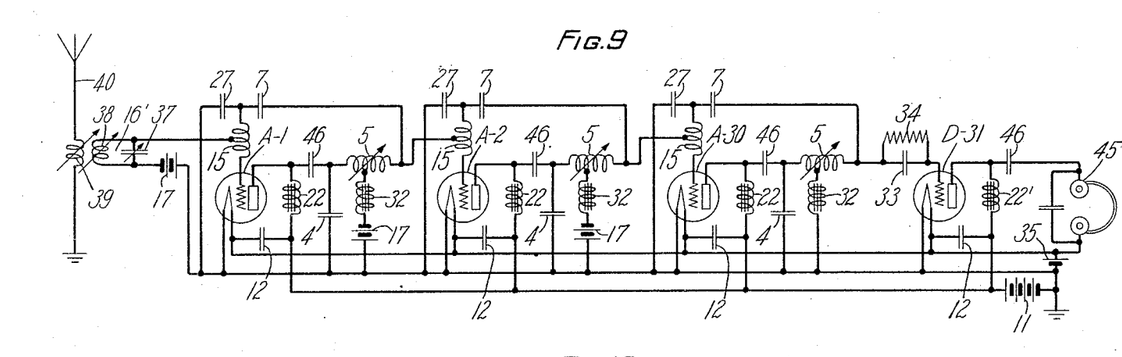
Fig. 9 shows a radio receiver embodying principles of the invention.

Fig. 9 shows a radio receiver including a multi-stage vacuum tube circuit incorporating amplifier circuits like the circuit of Fig. 8, with a detector stage at the end. In each amplifier stage, coupling effects of grid-plate capacity are neutralized, variable regeneration is provided and the regeneration is prevented from reacting on the input circuit connected to the stage.

In Fig. 9 there are three amplifier stages, comprising vacuum tubes A—1, A—2 and A—30, respectively, and the detector stage comprises tube D—31.

Plate current for each of the tubes is supplied from a common battery 11, through high frequency choke coil 22 individual to the tube in the case of each amplifier tube, and through a signal frequency choke coil 22′ in the case of the detector tube. A by-pass condenser 12 individual to each tube assists in preventing singing from occurring because of feed back along the B battery lead. In the circuit as shown, grid biasing potential for tube A—1 is supplied by a battery 17 individual to the tube, grid biasing potential for each of the other amplifier tubes is supplied from a battery 17 and high frequency choke coil 32 individual to the tube, and grid biasing potential for tube D—31 is provided by a condenser 33 and grid leak resistance 34 in series with a high frequency choke coil 32. However, it is not necessary that the sources of voltage for supplying biasing potentials to the grids of the tubes be individual to the tubes, if biasing circuits be used along which feed back and reaction will not occur. Filament heating current is supplied to each of the tubes from a common filament heating battery 35.

The input to the first amplifier stage is from across a parallel resonant or anti-resonant circuit 16′ comprising a condenser 37 and an inductance 38 which is magnetically coupled to an adjustable tuning inductance 39 connected in a wave collecting or receiving antenna 40. Either the condenser 37 or the inductance 38, or both, are adjustable for tuning the circuit 16′.

The detector tube supplies signals to a telephone 45.

Stopping condensers 46 prevent the steady voltage on the plates of tubes A—1, A—2, A—30 and D—31 from reaching the grids of tubes A—2, A—30 and D—31 and the telephone.

The balanced output circuits of tubes A—1, A—2 and A—3 are drawn in the form shown in Fig. 2, the load capacity into which each of these tubes delivers power being constituted however by the effective input capacity of next tube, respectively. Thus, each of these balanced output circuits comprises a tuned circuit 3 formed by the capacity 4, the adjustable tuning inductance 5 and the effective input capacity of the succeeding vacuum tube stage.

For each of the tubes A—1, A—2 and A—30 a balancing condenser 7 for neutralizing the coupling effects of the grid-plate capacity of the tube is shown connected in series with the regeneration coil 15 between the grid of the tube and a point of opposite potential to that of the plate of the tube on the tuning inductance 5 in the tuned circuit 3 which directly couples the tubes to the succeeding stage.

In the case of each of the tubes A—1, A—2 and A—30, a balancing condenser 27 balances the grid-filament capacity of the tube, as the condenser 27 balances the grid-filament capacity in Fig. 8.

Figure 10:
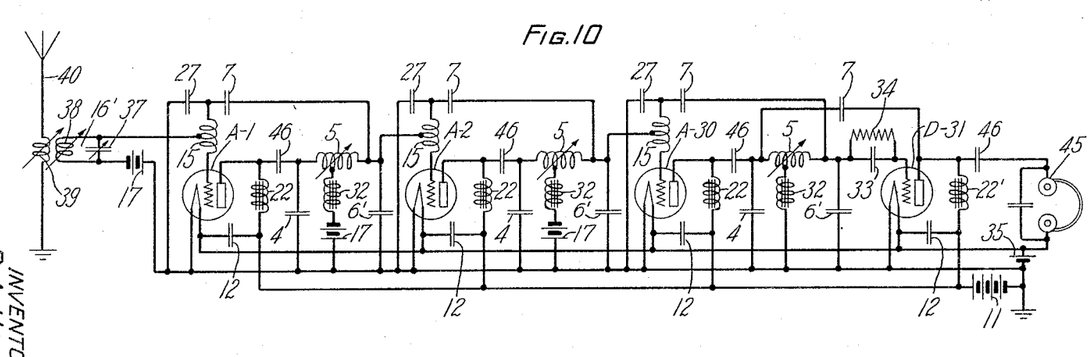
Fig. 10 shows a modification of the radio receiver of Fig. 9.

Fig. 10 shows a circuit the same as Fig. 9 except that the coupling effect of the grid-plate capacity of the detector tube is neutralized by a balancing condenser 7 in the manner indicated in Fig. 4, and in the case of each of the tubes A—2, A—30 and D—31, a condenser 6′ is added to increase the effective input capacity of the stage, in the manner indicated in Fig. 2. This increase is at a sacrifice of maximum gain, but enables smaller coils to be used and makes balancing easier. The neutralizing of the coupling effect of the grid-plate capacity of the detector tube reduces the resistance introduced into the circuit ahead and which it may be difficult to variably neutralize by variable regeneration.

Figure 11:
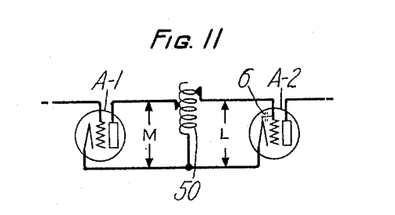
Figs. 11, 12, 13, 15, 19 and 20 are diagrams for facilitating explanations of the construction and operation of systems embodying forms of the invention as, for example, the system of Fig. 18.
Figure 12:
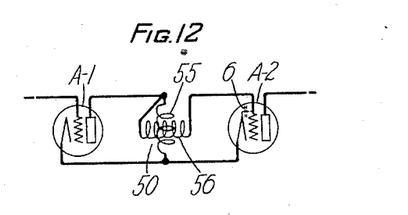

Figs. 11 to 17 show circuits for using mutual inductance coupling to the output side of a tube instead of the capacity coupling provided by condenser 4 in the figures described above. A mutual inductance is required to vary inversely with the square of the frequency for securing the desired characteristics of constant gain, maximum gain and constant band width over the range of tuning adjustments. Fig. 11 shows vacuum tubes A—1 and A—2 coupled through a variometer 50. In Fig. 11, the mutual inductance M should vary exactly as the tuning inductance L, or nearly so, if the desired characteristics are to be obtained over the range of adjustments of L for tuning with the effective input capacity of tube A—2. Fig. 12 shows the circuit of Fig. 11 with relatively movable coils 55 and 56 of the variometer 50 represented in the usual symbolic manner. If the tap conductor to the variometer takes in all of one of the two coils—that is, if the primary winding of the autotransformer constituting the variometer includes the whole of one of the two relatively movable coils and the two coils are about equal in inductance,— nearly this desired variation is obtained.

Figure 15:
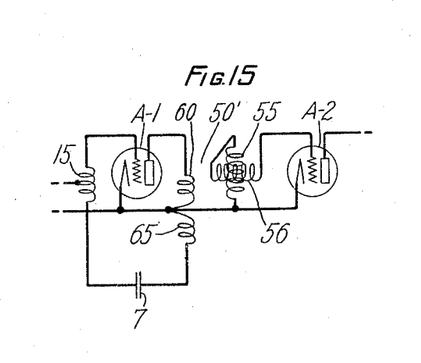
Figure 16:
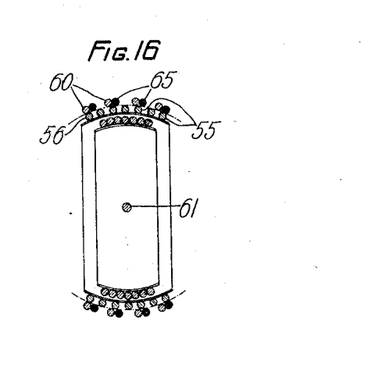
Fig. 16 is a cross-sectional view of an inductance device shown in Fig. 15.
Figure 17:
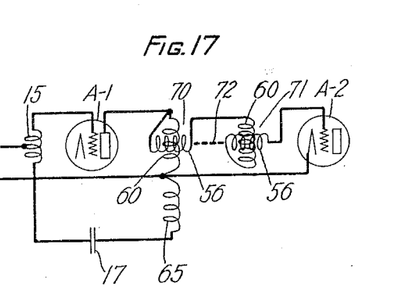
Fig. 17 shows a modification of circuits shown in Fig. 18 for coupling vacuum tubes and neutralizing coupling effects of interelectrode capacity in tubes.

If this gives too much coupling for the impedance of the tube feeding the variometer, special windings can be used, one example being shown in Figs. 13 to 16 and another example being shown in Fig. 17.

Figure 13:
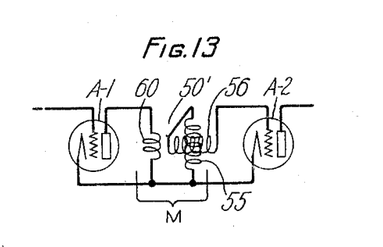
Figure 14:
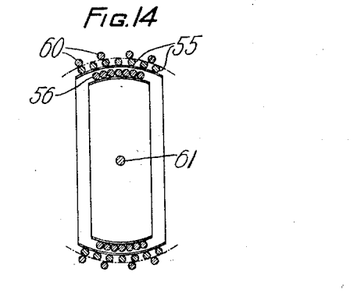
Fig. 14 is a cross-sectional view of an inductance device shown in Fig. 13.

In Fig. 13, the variometer comprises the relatively movable parts or coils 55 and 56 as before, the parts being coupled as nearly perfectly as practicable and coil 55, for example, being the fixed coil, and the variometer comprises in addition a mutual inductance winding 60 laid over the whole of one of the parts to give the required coupling to tube A—1. Fig. 14 is a diagrammatic cross sectional view of the variometer 50' of Fig. 13, and shows the movable coil 56 revolvable in the fixed coils 55 and 60 about the center at 61. The coefficient of coupling of the two fixed coils should be as high as possible.

Figs. 15 and 16 are like Figs. 13 and 14 respectively, except for the addition of a neutralizing winding 65 on the variometer, and a balancing condenser 7 and regeneration coil 15. The couplings of the fixed coil 55 to the primary winding 60 and the neutralizing winding 60 are as close as possible. The neutralizing winding provides a potential which is opposite in sign to that of the plate of tube A—1 and which is of such value that, when applied to the condenser 7 which balances the grid-plate capacity of the tube, it neutralizes the coupling effects of the latter capacity. It is sometimes desirable to have approximately a one to one ratio between grid-plate capacity and balancing capacity, and this type of circuit, as well as that shown in Fig. 17 described hereinafter, lends itself very easily to securing this relation. The regeneration coil 15 functions in the manner described above for this element, to produce regeneration increasing with frequency. The input circuit to the stage comprising tube A—1 is connected between the filament and a point dividing the inductance 15 as described above, so that the regeneration is prevented from reacting on that circuit.

A modification of the interstage coupling circuit and neutralizing circuit of Figs. 15 and 16, which has the same desirable operating characteristics, is a type comprising two variometer or other suitable inductances 70 and 71 connected as shown in Fig. 17, which if similarly constructed can be operated by the same shaft as indicated at 72. The neutralizing winding 65 can be wound closely with the coupling winding, as in the case of the variometer 50' of Figs. 15 and 16. The use of two variometers in the coupling circuit facilitates obtaining the proper impedance to match the space path impedance of the vacuum tube that feeds the coupling circuit.

Figure 18:
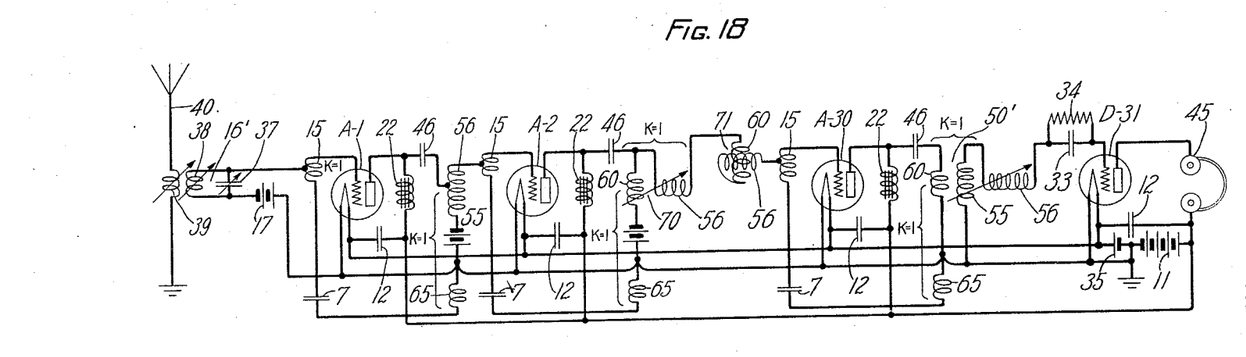
Fig. 18 shows a radio receiver embodying principles of the invention.

Fig. 18 shows a radio receiver including a multistage vacuum tube circuit incorporating amplifier circuits somewhat like the circuit of Fig. 8, with a detector stage at the end. In each amplifier stage, coupling effects of grid-plate capacity are neutralized and regeneration is prevented from reacting on the input circuit connected to the stage. The amplifier has the desired characteristics of constant gain, maximum gain per stage and constant band width over the tuning range.

The circuit of Fig. 18 is the same as that of Fig. 9 except as regards the interstage coupling circuits and the neutralizing circuits. In Fig. 18 the circuit coupling tubes A—1 and A—2 is of the type indicated in Fig. 12. The neutralizing potential for application to the balancing condenser 7 for neutralizng coupling effects of the grid-plate capacity of tube A—1 is obtained from a neutralizing winding 65 coupled as closely as possible to the winding 55, as in Figs. 15 and 16. This potential is of sign opposite to the alternating current potential of the plate of tube A—1. In Fig. 18 the circuits coupling tubes A—2 and A—30 and neutralizing the coupling effects of the grid-plate capacity of tube A—2 are as shown in Fig. 17; and the circuits coupling tubes A—30 and D—31 and neutralizing coupling effects of the grid-plate capacity of tube A—30 are as shown in Figs. 15 and 16.

Figure 19:
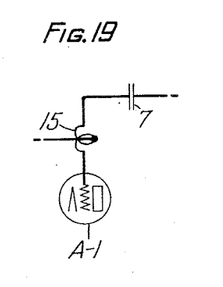
Figure 20:
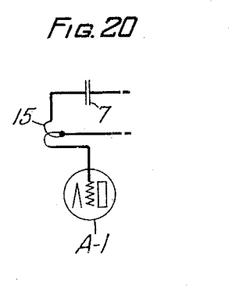

In the circuits described above employing coil 15 that coil with the tap and other connections must be placed so that proper balance occurs. The direction of running of the tap connection is of importance when a balance is attempted by mechanically constructing the coil with a center tap or with a given ratio. If the position of the tap is as shown in Fig. 20, the lead wire should run as in Fig. 20, or it may go through the coil as in Fig. 19. It may go over the end of the coil if the capacity to one end does not disturb the balance. The balance may be affected by the position of the lead wires for some distance, or up to a shielding point.

Figs. 21 to 27 show coupling circuits for securing constant gain, maximum gain and constant width of the frequency band transmitted, over the whole frequency range of tuning adjustments, without need for variable regeneration. In the case of these circuits the losses in the adjustable tuning inductance should be negligibly low, over that range, or in other words, the resistance of the inductance that provides for varying the tuning of the circuit should be a small part only of the total resistance of the coupling circuit attached to the output side of a tube. With these coupling circuits there is then secured, over that range the characteristic of constant ratio of resistance to inductance, of the impedance attached to the output side of the tube. In these circuits variable resistance with frequency is introduced into the tuned circuit by connecting resistance across some capacity in the tuned circuit.

Figure 21:
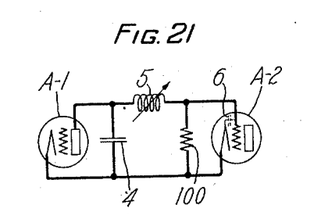
Figs. 21 to 23 are diagrams of vacuum tube coupling circuits, for facilitating explanation of the operation of systems embodying forms of the invention as, for example, the radio receiver of Fig. 27.

In Fig. 21 the latter resistance is a fixed resistance 100 across the load capacity or capacity into which the circuit works, which is there the effective input capacity 6 as in the case of Fig. 1. The resistance 100 might be due to effective input resistance of the tube A—2.

Figure 22:
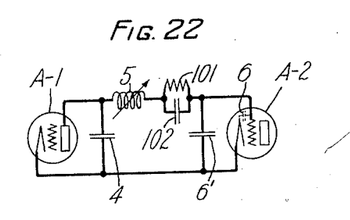

Approximately the desired characteristics can also be secured by connecting a fixed resistance 101 across a capacity 102 inserted directly in the circuit as shown in Fig. 22. This combination introduces resistance inversely with the square of the frequency, and thereby maintains the resistance to inductance ratio of the tuned circuit approximately constant over the frequency range covered by the variations in the tuning.

Figure 23:
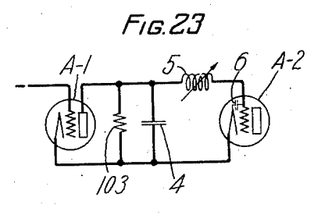

If it is not desirable to use high resistances or if the input resistance of the grid does not produce an equivalent resistance, then the resistance may be connected as shown in Fig. 23, wherein 103 is a resistance equal to the output impedance of the tube A—1. (The presence of added capacity 6' is optional, as explained in connection with Figs. 2 and 10.) In this case, as in the case of Figs. 21 and 22, the losses in the tuned circuits should be negligible. With this circuit, as with that of Fig. 21, the impedance attached to the output side of the tube A—1 will be constant for all adjustments of the variable inductance, and the characteristics of constant gain, maximum gain and constant width of transmitted frequency band will obtain.

Without resistance 100, 101 or 103 but with a low resistance to inductance ratio in the tuned circuit, singing will occur in any stage, unless the grid-plate capacity is very accurately neutralized or unless shielded element tubes are used. If an accurate neutralization of the grid-plate capacity is secured or if shielded element tubes are used, more gain is usually secured but it will not be as constant, unless resistance such as 100, 101 or 103 be used. By connecting one of these resistances in the circuit as shown, the accuracy of neutralization needed is reduced to a practicable value and constant gain and band width are assured. The resistance for accomplishing the functions of resistance 100, 101 or 103 can be placed across the adjustable inductance 5 instead.

Figure 24:
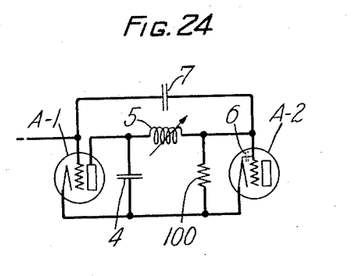
Figs. 24 to 26 show means for neutralizing coupling effects of interelectrode capacity in vacuum tubes connected in circuits such as those of Figs. 21 to 23.

The neutralization of coupling effects of grid-plate capacity just referred to, can be accomplished as indicated in Figs. 24 to 27. Fig. 24 shows the neutralizing condenser 7 connected as in Fig. 2.

Figure 25:
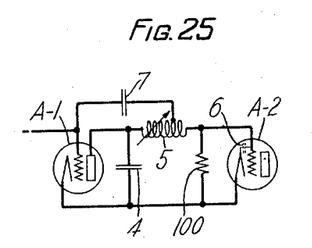

As shown in Fig. 25, the neutralizing condenser 7 can, if desired, be connected between the grid of tube A—1 and a point along the coil 5 located between the grid of the following tube (A—2) and the point on the coil having no alternating current potential difference from the filament. A larger condenser 7 than that required for the neutralizing connection shown in Fig. 24 can then be used and its size will depend upon the point of connection to the coil. When the neutralizing point is a point thus chosen along the variable inductance 5 as in Fig. 25 so as to make the balancing capacity approximately equal to, or larger than, the grid-plate capacity, the ratio of the self inductance of the part of coil 5 between the plate of tube A—1 and the neutralizing point to that of the whole coil must remain constant. That is, the ratio of L+M of the part of the coil between this point and the plate of tube A—1 to the total L of the coil must remain constant as the total L of the coil is varied, where L signifies self inductance and M signifies mutual inductance between the two parts of the coil.

Figure 26:
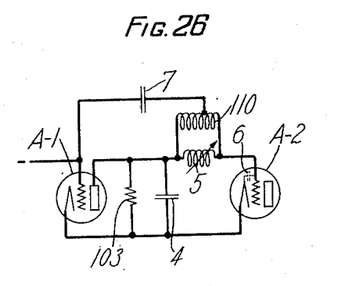

As shown in Fig. 26, the neutralizing condenser 7 can, if desired, be connected to a point, other than the end points, on a fixed inductance or impedance 110 which is connected in parallel relation to the adjustable tuning inductance 5.

If desired, neutralization can be accomplished by connecting the balancing condenser 7 to a neutralizing winding closely coupled to the inductance 5; but the neutralization so obtained will not be exact at all frequencies unless the coupling is perfect.

Figure 27:
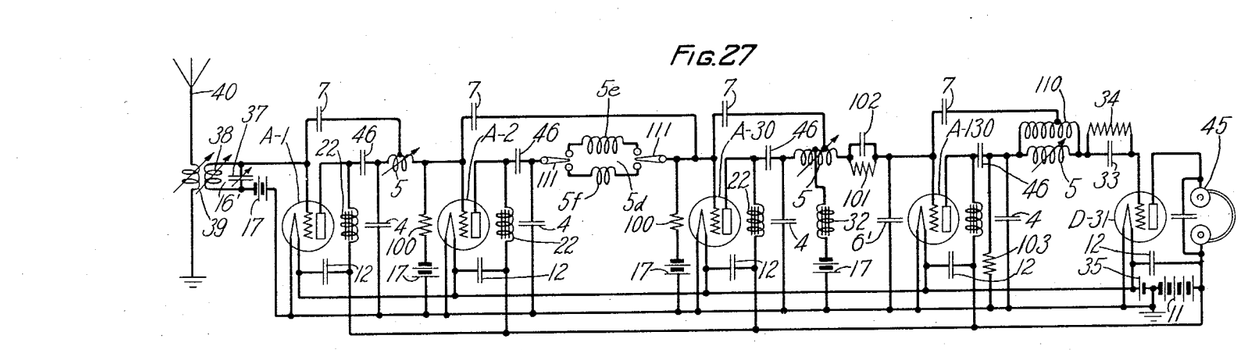
Fig. 27 shows a radio receiver incorporating features of the invention that are indicated in Figs. 21 to 26.

The system of Fig. 27 is a radio receiver comprising four amplifier stages with a detector stage at the end. The amplifier stages comprise vacuum tubes A—1, A—2, A—30 and A—130 respectively. The detector stage comprises vacuum tube D—31.

Plate current for each of the tubes is supplied from a common battery 11, through a high frequency choke coil 22 individual to the tube in the case of each of the amplifier tubes and through telephone receiver 45 in the case of the detector tube. A by-pass condenser 12 individual to each tube prevents the plate battery circuit from applying voltage fluctuations to the plate. Grid biasing potential for tube A—1 is supplied by a battery 17 individual to the tube. Grid biasing potential for each of the two amplifier tubes A—2 and A—30 is supplied from a battery 17 individual to the tube through a resistance 100 (not a grid leak resistance) individual to the tube. Grid biasing potential for tube A—30 is supplied from a battery 17 and high frequency choke coil 32 individual to the tube. Grid biasing potential for the detector tube D—31 is provided by a condenser 33 and grid leak resistance 34. Filament heating current is supplied to each of the tubes from a common filament heating battery 35.

The input to the first amplifier stage is from across parallel resonant or anti-resonant circuit 16′ comprising adjustable tuning condenser 37 and adjustable tuning inductance 38 which is magnetically coupled to adjustable tuning inductance 39 connected in antenna 40.

The detector tube supplies signals to telephone receiver 45.

Stopping condensers 46 prevent the steady voltage on the plates of tubes A—1, A—2, A—30 and A—130 from reaching the grids of tubes A—2, A—30, A—130 and D—31, respectively.

The balanced output circuit of tube A—1 comprises a tuned circuit including condenser 4, a variable tuning inductance 5 and the effective input capacity of the next vacuum tube stage. The filament of tube A—1 is connected to the junction of the latter capacity and the condenser 4. Resistance 100 across the grid and filament of tube A—2 is not a grid leak resistance. It functions as described in connection with Fig. 21. Its value may be of the order of 50,000 ohms or 100,000 ohms, for example, the ratio of its value to the value of the space path resistance of the preceding space discharge device being made approximately equal to the ratio of the capacity 4 to the effective input capacity of the following space discharge device. Ordinarily, with the customary vacuum tubes of the three electrode type in the circuit, the latter capacity is small compared to the capacity of condenser 4.

A balancing condenser 7 for neutralizing coupling effects of grid-plate capacity of tube A—1 is connected between the grid of that tube and a suitable point on the inductance coil 5 so as to give a convenient ratio of balancing capacity to grid-plate capacity, and the coil is preferably of fine stranded wire or other low resistance material so that as the adjustment is changed little or no change occurs in the ratio of the inductance of the portion of coil 5 between the neutralizing or tapped point and the plate of the tube A—1 to the inductance of the whole coil.

The balanced output circuit of tube A—2 comprises a tuned circuit including condenser 4, a variable tuning inductance 5d constituted by fixed inductance coils such as 5e and 5f that have different values of inductance and may be switched in and out of circuit by switches 111, and the effective input capacity of the next vacuum tube stage. The filament of the tube A—2 is connected to the junction of the latter capacity and the condenser 4. Resistance 100 across the grid and filament of tube A—30 is proportioned and functions in the manner described for the resistance 100 in the preceding coupling circuit of the system. The inductances 5e and 5f are preferably of fine stranded wire, so that their resistance is low even for the highest frequencies used. The balancing condenser 7 for neutralizing coupling effects of the grid-plate capacity of tube A—2 is connected between the grid of the tube and the end of variable inductance 5d remote from the plate of the tube, as in the case of Fig. 24. The tuning for this coupling circuit is done by manipulating switches 111 to vary the amount of inductance introduced into the circuit by the variable inductance device 5d. It will be seen that the circuit coupling tubes A—2 and A—3 is the same as that coupling the two tubes A—1 and A—2 in Fig. 24, except that in Fig. 27 there is a specific indication of a manner of varying the tuning inductance and of the manner of supplying steady plate and grid potentials.

The circuit coupling tubes A—130 is of the type shown coupling tubes A—1 and A—2 in Fig. 22. The resistance 101 is not a grid leak resistance. It functions as described above in connection with Fig. 22. The values of capacity 102 and resistance 101 may be, for example, of the order of 50 mmf. and 100,000 ohms. The balancing condenser 7 for neutralizing coupling effects of the grid-plate capacity of tube A—30 is connected between the grid of the tube and a point on inductance 5 having an alternating potential of sign opposite that of the plate of the tube. The tuning of this coupling circuit is done by adjusting the variable inductance 5. The showing of the inductance is intended to represent a variable inductance of any suitable type as, for example, the type of inductance 5, or the type of inductance 5d. If the latter type be used, the neutralizing or tapping point on each of its coils such as 5e and 5f should be a point at the proper potential to apply the correct neutralizing potential to the balancing condenser 7.

The circuit coupling tubes A—130 and D—31 is that shown in Fig. 26 as coupling tubes A—1 and A—2, except for the addition of the condenser 33 and grid leak resistance 34 which are of the usual type, and the showing of the circuits for supplying steady plate and grid potentials.

Figure 28:
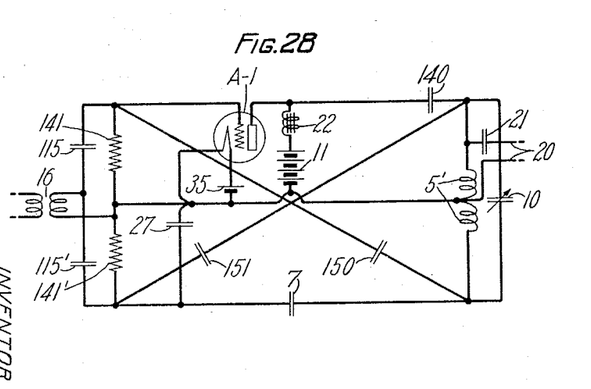
Fig. 28 shows an oscillator embodying features of the invention.

Fig. 28 is a neutralized oscillator circuit somewhat similar to that of Fig. 6. However, in the circuit of Fig. 28 the amount of regeneration does not vary with the frequency, and no inductance corresponding to the inductance 15 of Fig. 6 is required. Instead, the regeneration is prevented from reacting on the input transformer or circuit 16 by connecting the input circuit between the filament and the junction of two condensers 115 and 115' which are connected in series with the balancing condenser 7 between the grid and that end of inductance 5' having its potential opposite in sign to the alternating plate potential. The condenser 7 balances the grid-plate capacity of the tube to neutralize coupling effects of that capacity between the output and input sides of the circuit. Space current is supplied by battery 11 through choke coil 22. A blocking condenser 140 prevents the short circuiting of battery 11 through the upper portion of inductance 5'. A balancing condenser 27 balances the grid-filament capacity. Grid biasing potential is provided by a grid leak resistance 141 in cooperation with the condenser 115. A balancing resistance 141' balances the grid leak resistance. Two condensers 150 and 151, each of capacity large compared to the grid-plate capacity of the tube, cause the circuit to generate sustained oscillations. Condenser 150 is connected between the grid and a point on the inductance 5' having an alternating potential opposite in sign to the plate potential. Condenser 151 is connected between a point on the inductance 5' having a potential of the same sign as the plate potential and junction of condensers 7 and 27. The tuning of the circuit is accomplished by varying the capacity of condenser 10 as in the case of Fig. 6.

Figure 29:
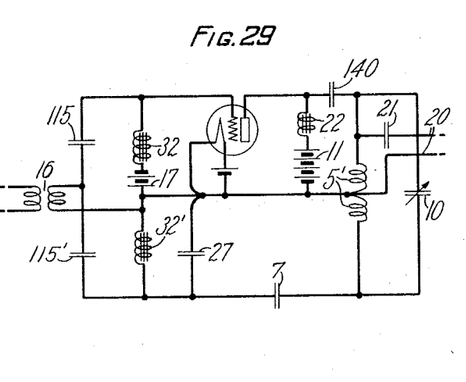
Fig. 29 shows an amplifier with similar features.

Fig. 29 is a neutralized amplifier circuit similar to the oscillator circuit of Fig. 28, but without the condensers 150 and 151 of Fig. 28 which cause the circuit of that figure to generate sustained oscillations. Instead of the grid leak resistance 141 of Fig. 28, Fig. 29 employs battery 17 and choke coil 32 for supplying grid biasing potential. A balancing choke coil 32' is used to balance coil 32. In this amplifier as in the oscillator of Fig. 28, reaction on input circuit 16 is prevented. In the system of Fig. 29 the feedback through condenser 7, opposing that through the grid-plate capacity of the tube, stabilizes the gain of the system and prevents singing.

In Figs. 28 and 29, as in the case of Figs. 5 and 6, a work circuit can be connected across any portion of coil 5', and by way of example such a circuit 20 with a blocking or stopping condenser 21 therein is shown connected across the upper part of the coil.

Where, in the circuits described above, it is desired to use four-electrode, shielded grid tubes, instead of three-electrode tubes, neutralization of coupling effects of grid-plate capacity becomes unnecessary.

What is claimed is:

1. The method of operating a multistage vacuum tube circuit including inductive reactance connected between two of the vacuum tube stages which comprises varying that reactance and maintaining the width of the transmitted frequency band and the gain of the circuit for that band the same for different values of that reactance.

2. The method of operating a multistage vacuum tube circuit having an impedance element connected between two of the vacuum tube stages that is adjustable for varying the adjustment of the circuit with respect to the frequencies that the circuit is capable of transmitting, which comprises changing the adjustment of the circuit in that respect and at the same time maintaining substantially constant the width of the frequency band that the circuit is capable of transmitting and the transmission equivalent of the circuit for that band, by adjusting that element.

3. A circuit adjustable as to the frequencies that it is capable of transmitting, comprising two vacuum tubes, one for amplifying waves transmitted to it from the other, means automatically responsive to change in the frequencies impressed upon the circuit for maintaining its gain and the width of the frequency band that it transmits approximately constant throughout a wide range of adjustment of the circuit as to the frequencies that it is capable of transmitting, and a coupling network included in said means for coupling said vacuum tubes, said network having a tuning inductance therein variable for effecting said adjustment of the circuit as to the frequencies that it is capable of transmitting.

4. A multistage vacuum tube radio receiver adjustable as to the frequency that it is capable of receiving, comprising means automatically responsive to change in the frequencies impressed upon the receiver for maintaining its gain and the width of the frequency band that it receives approximately constant throughout a wide range of adjustment of the receiver as to the frequencies that it is capable of receiving, and a coupling network included in said means for coupling two of the vacuum tube stages, the effective input impedance of the stage receiving power from said network constituting a shunt arm of the network.

5. The method of operating a frequency selective circuit including an electric space discharge device and adjustable as to the frequencies that it is capable of transmitting which comprises so changing the adjustment of the circuit with respect to the frequencies that it is capable of transmitting as to tend to vary the gain of the circuit and the width of the frequency band that the circuit is capable of transmitting, and causing regeneration in the circuit to so vary in response to variation in the frequency transmitted by the circuit as to compensate for the tendency.

6. The method of operating a wave transmission system including two electric space discharge devices and a frequency selective coupling circuit therefor having an adjustable inductance device, which comprises varying the frequency selectivity of the coupling circuit by varying the adjustment of the inductance device, and causing regeneration in the system to compensate for variations of the gain and of the width of the transmitted frequency band that tend to result from change of the ratio of the resistance of the inductance device to its inductance.

7. A system comprising two stages of electric space discharge devices, and tuning means coupling said stages in tandem relation, said tuning means comprising two fixed shunt arms and a variable series arm connected therebetween, said series arm being inductive and each of said shunt arms being capacitive, one of said shunt capacitive arms being a condenser connected across the output of the stage delivering power for coupling that stage to said tuning means, and the other of said shunt capacitive arms being the effective input capacity of the stage receiving power.

8. A Wheatstone bridge having two pairs of opposite arms, an electric space discharge tube stage having its effective input capacity in one of said arms and an electric space discharge device having an anode, a cathode and a discharge control electrode, said device having its anode-control electrode capacity in the arm of said bridge opposite said one arm.

9. A system comprising electric space discharge apparatus having an anode, a cathode and a discharge control electrode, means for adjusting said apparatus with respect to the frequencies that it is capable of transmitting, in such manner as to tend to change its gain for those frequencies, and means for preventing undesired coupling effects between the input and output circuits of said apparatus and for causing in said apparatus regeneration so varying with the frequency of the waves transmitted thereby as to compensate for said tendency.

10. The combination with a frequency selective wave transferring network comprising two shunt capacity arms and a variable tuning inductance forming a series arm of said network connected between said shunt arms for adjusting the tuning of said network over a wide frequency range, of a vacuum tube stage the effective input capacity of which forms one of said capacity arms.

11. The combination with a network comprising two shunt capacity arms and a series arm including a variable tuning inductance connected between said shunt arms, of a vacuum tube stage the effective input capacity of which forms one of said capacity arms, and means for supplying waves to be transmitted by said stage, coupled to said network by the other of said capacity arms, the capacity of said one arm being smaller than the capacity of said other arm.

12. The combination with a network comprising two shunt capacity arms and an inductive series arm including variable inductance connected between said shunt arms, of an electric space discharge device, one of said capacity arms coupling said network to the output side of said device, and a load device the effective input capacity of which forms the other of said capacity arms, the latter capacity being smaller than the capacity of said one arm.

13. The combination with a network comprising two shunt capacity arms and an inductive series arm connected between said shunt arms, of an electric space discharge device, one of said capacity arms coupling said network to the output side of said device, means including a portion of said network for neutralizing coupling effects of inter-electrode capacity in said device, and a load device, the effective input capacity of which forms the other of said capacity arms.

14. The combination with a network of tuning elements which consist of two shunt capacity arms and a variable inductive series arm connected between said shunt arms, of an electric space discharge device, one of said capacity arms coupling said network to the output side of said device, and a vacuum tube stage the effective input capacity of which forms the other of said two capacity arms.

15. The combination with a network comprising two shunt capacity arms and an inductive series arm connected between said shunt arms, of an electric space discharge device, one of said capacity arms coupling said network to the output side of said device, and a vacuum tube stage the effective input capacity of which forms the other of said two capacity arms, the reactances of said arms having such values that said network forms a tuned circuit for passing frequencies in the neighborhood of its resonance frequency to the exclusion of higher and lower frequencies.

16. A system comprising an electric space discharge device, a vacuum tube stage, frequency selective means for transferring power from said device to said stage, said means comprising two impedance devices having similar impedance frequency characteristics, one of said impedance devices coupling the output side of said discharge device to said means, and the effective input capacity of said stage forming the other of said impedance devices, and means including a portion of the first mentioned means for neutralizing coupling effects of inter-electrode capacity in said system.

17. The combination with a network comprising two shunt capacity arms and a variable tuning inductance forming a series arm of said network connected between said shunt arms, of an electric space discharge device, one of said capacity arms coupling said network to the output side of said device, and means for causing variable regeneration in said device upon variation of the frequencies transmitted through the network.

18. The combination with a wave transferring network comprising two shunt capacity arms and a variable tuning inductance forming a series arm of said network connected between said shunt arms, of an electric space discharge device, one of said capacity arms coupling said network to the output side of said device, and means for neutralizing coupling effects of inter-electrode capacity in said device and for causing regeneration in said device upon variation of the frequencies transmitted through the network.

19. The combination with a wave transferring network comprising two shunt capacity arms and a variable tuning inductance forming a series arm of said network connected between said shunt arms, of an electric space discharge device, one of said capacity arms coupling said network to the output side of said device, and means for neutralizing coupling effects of inter-electrode capacity in said device and for causing increase and decrease of regeneration in said device upon increase and decrease, respectively, of the frequencies transmitted through the network.

20. A system comprising an electric space discharge device having an anode, a cathode and a discharge control electrode, an impedance having one terminal connected to said control electrode, a capacity for balancing the capacity between the anode and the control electrode in said device, said first mentioned capacity being connected between the other terminal of said impedance and a point on the output circuit of said device at a potential of sign opposite to that of the potential of said anode with respect to said cathode, and an input circuit for said device connected between said cathode and a point on said impedance between said terminals and electrically remote from each.

21. A system comprising an electric space discharge device having an anode, a cathode and a discharge control electrode, an impedance having one terminal connected to said control electrode, a capacity for balancing the capacity between the anode and the control electrode in said device, said first mentioned capacity being connected between the other terminal of said impedance and a point on the output circuit of said device at a potential of sign opposite that of the potential of said anode with respect to said cathode, and an input circuit for said device connected between said cathode and a point on said impedance between said terminals and electrically remote from each, said impedance being inductance.

22. A system comprising electric space discharge apparatus having an anode, a cathode and a discharge control electrode, means for adjusting the frequency selectivity of said apparatus, and means for neutralizing partly and to a degree varying with said frequency adjustment coupling effects of inter-electrode capacity in said apparatus and for causing in said apparatus regeneration increasing with increase in the frequency of the waves transmitted thereby.

23. A system comprising electric space discharge apparatus having an anode, a cathode and a discharge control electrode, means for adjusting the frequency selectivity of said apparatus, and means for neutralizing coupling effects of inter-electrode capacity in said apparatus and for causing in said apparatus regeneration varying with the frequency of the waves transmitted thereby, said latter means comprising an inductance and a capacity connected in series between said control electrode and a point in the output circuit of said apparatus at a potential different from that of said cathode.

24. A system comprising electric space discharge apparatus having an anode, a cathode and a discharge control electrode, means for adjusting the frequency selectivity of said apparatus, and means for neutralizing coupling effects of inter-electrode capacity in said apparatus and for causing in said apparatus regeneration varying with the frequency of the waves transmitted thereby, said latter means comprising an inductance and a capacity connected in series between said control electrode and a point in the output circuit of said apparatus at a potential of sign opposite to that of said anode with respect to said cathode.

25. The method of operating a multistage vacuum tube circuit including a reactance of one sign connected between two of the vacuum tube stages, which comprises varying the reactance and maintaining the ratio of the resistance of the circuit to its inductance for waves of the frequencies transmitted by the circuit approximately the same for different values of said reactance.

26. A circuit adjustable as to the frequencies that it is capable of transmitting, comprising two vacuum tubes, one for amplifying waves transmitted to it from the other, means automatically responsive to change in the frequencies impressed upon the circuit for maintaining its gain and the width of the frequency band that it transmits approximately constant throughout a wide range of adjustment of the circuit as to the frequencies that it is capable of transmitting, and a coupling network included in said means for coupling said vacuum tubes, said network having therein a variable tuning inductance with a mutual inductance coupling said network to the output side of said other tube, for effecting said adjustment of the circuit as to the frequencies that it is capable of transmitting.

27. The combination with a network comprising two shunt capacity arms and a variable tuning inductance forming a series arm of said network connected between said shunt arms, of an electric space discharge device, one of said capacity arms coupling said network to the output side of said device, and means for maintaining approximately constant the ratio of resistance to inductance in the impedance that said network presents to said device for the frequencies transmitted through the network, over a range of variation of said inductance.

In witness whereof, I hereunto subscribe my name this 22nd day of October, 1928.

RAYMOND A. HEISING.